US011563895B2

(12) United States Patent
Blanco et al.

(10) Patent No.: US 11,563,895 B2
(45) Date of Patent: Jan. 24, 2023

(54) SYSTEM AND METHOD FOR DISPLAYING OBJECTS OF INTEREST AT AN INCIDENT SCENE

(71) Applicant: MOTOROLA SOLUTIONS, INC., Chicago, IL (US)

(72) Inventors: Alejandro G. Blanco, Fort Lauderdale, FL (US); Patrick D. Koskan, Jupiter, FL (US); Shervin Sabripour, Plantation, FL (US); Craig F Siddoway, Davie, FL (US); Bert Van Der Zaag, Wheat Ridge, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 779 days.

(21) Appl. No.: 15/386,917

(22) Filed: Dec. 21, 2016

(65) Prior Publication Data

US 2018/0176474 A1 Jun. 21, 2018

(51) Int. Cl.
*G06F 3/0482* (2013.01)
*G06F 16/583* (2019.01)
(Continued)

(52) U.S. Cl.
CPC ....... *H04N 5/23293* (2013.01); *G06F 40/169* (2020.01); *G06T 11/60* (2013.01);
(Continued)

(58) Field of Classification Search
CPC ........ H04N 5/23293; H04N 2201/3253; G06F 17/241; G06F 3/04842; G06F 3/0488;
(Continued)

(56) References Cited

U.S. PATENT DOCUMENTS 8,400,548 B2   3/2013  Bilbrey et al.
9,235,051 B2   1/2016  Salter et al.
(Continued)

OTHER PUBLICATIONS

PCT/US2017/062861 Invitation to Pay Additional Fees and Communication Relating to the Results of the Partial International Search Report from the International Searching Authority dated Mar. 13, 2018 (14 pages).
(Continued)

*Primary Examiner* — Patrick E Demosky
(74) *Attorney, Agent, or Firm* — Michael Best & Friedrich LLP

(57) ABSTRACT

A system and method for displaying an image of an object of interest located at an incident scene. The method includes receiving, from the image capture device, a first video stream of the incident scene, and displaying the video stream. The method includes receiving an input indicating a pixel location in the video stream, and detecting the object of interest in the video stream based on the pixel location. The method includes determining an object class, an object identifier, and metadata for the object of interest. The metadata includes the object class, an object location, an incident identifier corresponding to the incident scene, and a time stamp. The method includes receiving an annotation input for the object of interest, and associating the annotation input and the metadata with the object identifier. The method includes storing, in a memory, the object of interest, the annotation input, and the metadata.

16 Claims, 12 Drawing Sheets

(51) Int. Cl.
*H04N 5/232* (2006.01)
*G06T 11/60* (2006.01)
*G11B 27/28* (2006.01)
*G11B 27/11* (2006.01)
*G06F 40/169* (2020.01)
*G06V 10/10* (2022.01)
*G06V 10/22* (2022.01)
*G06V 20/10* (2022.01)
*G06V 20/20* (2022.01)
*G06F 3/04842* (2022.01)

(52) U.S. Cl.
CPC ............ *G06V 10/17* (2022.01); *G06V 10/235* (2022.01); *G06V 20/10* (2022.01); *G06V 20/20* (2022.01); *G11B 27/11* (2013.01); *G11B 27/28* (2013.01); *G06F 3/04842* (2013.01); *G06T 2219/004* (2013.01)

(58) Field of Classification Search
CPC ............ G06K 9/2081; G06K 9/00664; G06K 9/4671; G06K 9/6267; G06T 11/60; G06T 2219/004; G06T 19/006; G06T 7/60; G11B 27/11; G11B 27/28
See application file for complete search history.

(56) References Cited

U.S. PATENT DOCUMENTS

| | | |
|---|---|---|
| 9,412,206 B2 | 8/2016 | McMahon et al. |
| 2009/0210801 A1 | 8/2009 | Bakir et al. |
| 2010/0023878 A1 | 1/2010 | Douris et al. |
| 2010/0208033 A1 | 8/2010 | Edge et al. |
| 2012/0088526 A1* | 4/2012 | Lindner ............ H04M 1/72522 455/457 |
| 2013/0063487 A1 | 3/2013 | Spiegel et al. |
| 2014/0016825 A1* | 1/2014 | Kasahara ................ G06T 11/00 382/103 |
| 2015/0178953 A1* | 6/2015 | Gao .................... G06F 17/2765 345/681 |
| 2016/0224591 A1* | 8/2016 | Kim .................. G06F 17/30247 |
| 2016/0321841 A1* | 11/2016 | Christen ................ G06T 19/006 |
| 2017/0053538 A1* | 2/2017 | Samarasekera ...... G06K 9/6267 |

OTHER PUBLICATIONS

PCT/US2017/062861 International Search Report and Written Opinion from the International Searching Authority dated May 8, 2018 (19 pages).
Australian IP Examination Report No. 1 dated Mar. 14, 2020 for related Australian Application No. 2017379659 (3 pages).
Examination Report issued by the United Kingdom Intellectual Property Office for Application No. 1907728.8 dated Dec. 18, 2020 (2 pages).

* cited by examiner

SYSTEM AND METHOD FOR DISPLAYING OBJECTS OF INTEREST AT AN INCIDENT SCENE

BACKGROUND OF THE INVENTION

Public safety personnel responding to an incident scene (for example, a crime scene, a traffic accident, and the like) may document the incident scene for later use as evidence in criminal trials or other official investigations or proceedings. Personnel document the scene itself (for example, an intersection, an outdoor area, a space within a building, and the like) as well as objects of interest located at the incident scene. An object of interest is any object present at the incident scene and related to the incident (for example, involved in or relevant to an investigation of the incident). Objects of interest may include, for example, automobiles (for example, in the case of a traffic accident) and weapons (for example, in the case of a crime scene). Public safety personnel may document the incident scene and objects of interest by using portable electronic devices (for example, body-worn cameras, smart telephones, portable radios, and the like) to record still images and video of the object of interest, or to record audio or text describing the object of interest.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
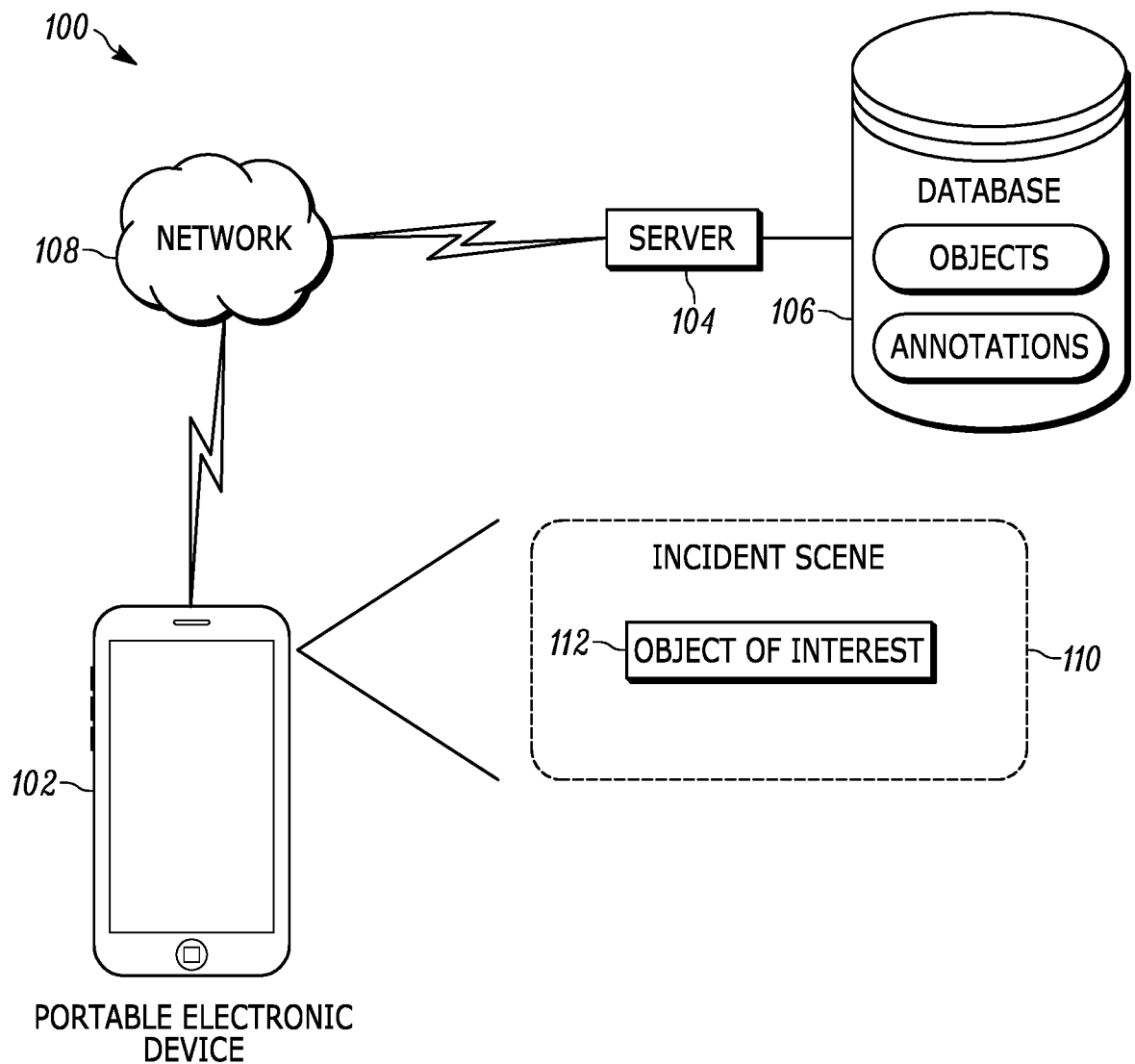
FIG. 1 is a diagram of system for a displaying an image of an object of interest located at an incident scene in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel (for example, first responders, investigators, and the liked) responding to an incident scene may document the incident scene and the objects of interest located at the incident scene. Public safety personnel may document the incident scene using portable electronic devices to record still images or video of the object of interest, to record audio or text describing the object of interest, or some combination of the foregoing. In some cases, objects of interest are removed from the incident scene to, for example, clean up the scene or to be used later use as evidence in criminal trials or other official investigations or proceedings. Investigations of incident scenes may be stopped and restarted, and may be performed by multiple personnel at many times. An investigation of an incident scene may also be restarted after the incident scene has been fully documented and all objects of interest documented and removed. An investigator may wish to re-create an incident scene, or may wish to compare multiple incidents that occurred at the same scene. Current systems and methods for documenting objects of interest are inefficient in such investigations. Accordingly, because current systems and methods do not provide selection, recognition, and annotation of an object of interest from a live scene based on user input, systems and methods are provided herein for, among other things, displaying an image of an object of interest located at an incident scene.

One example embodiment provides a system for displaying an image of an object of interest located at an incident scene. The system includes an image capture device, a display, a memory, and an electronic processor coupled to the image capture device, the display, and the memory. The electronic processor is configured to receive, from the image capture device, a first video stream of the incident scene. The electronic processor is configured to display the first video stream on the display. The electronic processor is configured to receive an input indicating a pixel location in the first video stream. The electronic processor is configured to detect the object of interest in the first video stream based on the pixel location. The electronic processor is configured to determine an object class for the object of interest. The electronic processor is configured to determine an object identifier for the object of interest. The electronic processor is configured to determine metadata for the object of interest including the object class, an object location, an incident identifier corresponding to the incident scene, and a time stamp. The electronic processor is configured to receive an annotation input for the object of interest. The electronic processor is configured to associate the annotation input and the metadata with the object identifier. The electronic processor is configured to store, in the memory, the object of interest, the annotation input, and the metadata.

Another example embodiment provides a method for displaying an image of an object of interest located at an incident scene. The method includes receiving, from the image capture device, a first video stream of the incident scene. The method includes displaying the first video stream on the display. The method includes receiving an input indicating a pixel location in the first video stream. The method includes detecting the object of interest in the first video stream based on the pixel location. The method includes determining an object class for the object of interest. The method includes determining an object identifier for the object of interest. The method includes determining metadata for the object of interest including the object class, an object location, an incident identifier corresponding to the incident scene, and a time stamp. The method includes receiving an annotation input for the object of interest. The method includes associating the annotation input and the metadata with the object identifier. The method includes storing, in a memory, the object of interest, the annotation input, and the metadata.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is a block diagram of a system 100 for displaying an image of an object of interest located at an incident scene. In the example illustrated, the system 100 includes a portable electronic device 102, a server 104, a database 106, and a network 108. The portable electronic device 102 and the server 104 are communicatively coupled via the network 108. The network 108 is a communications network including wireless and wired connections. The network 108 may be implemented using a land mobile radio (LMR) network, and a cellular network (for example, a Long Term Evolution (LTE) network). However, the concepts and techniques embodied and described herein may be used with networks using other protocols, for example, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed network architectures. In some embodiments, communications with other external devices (not shown) occur over the network 108.

Figure 2:
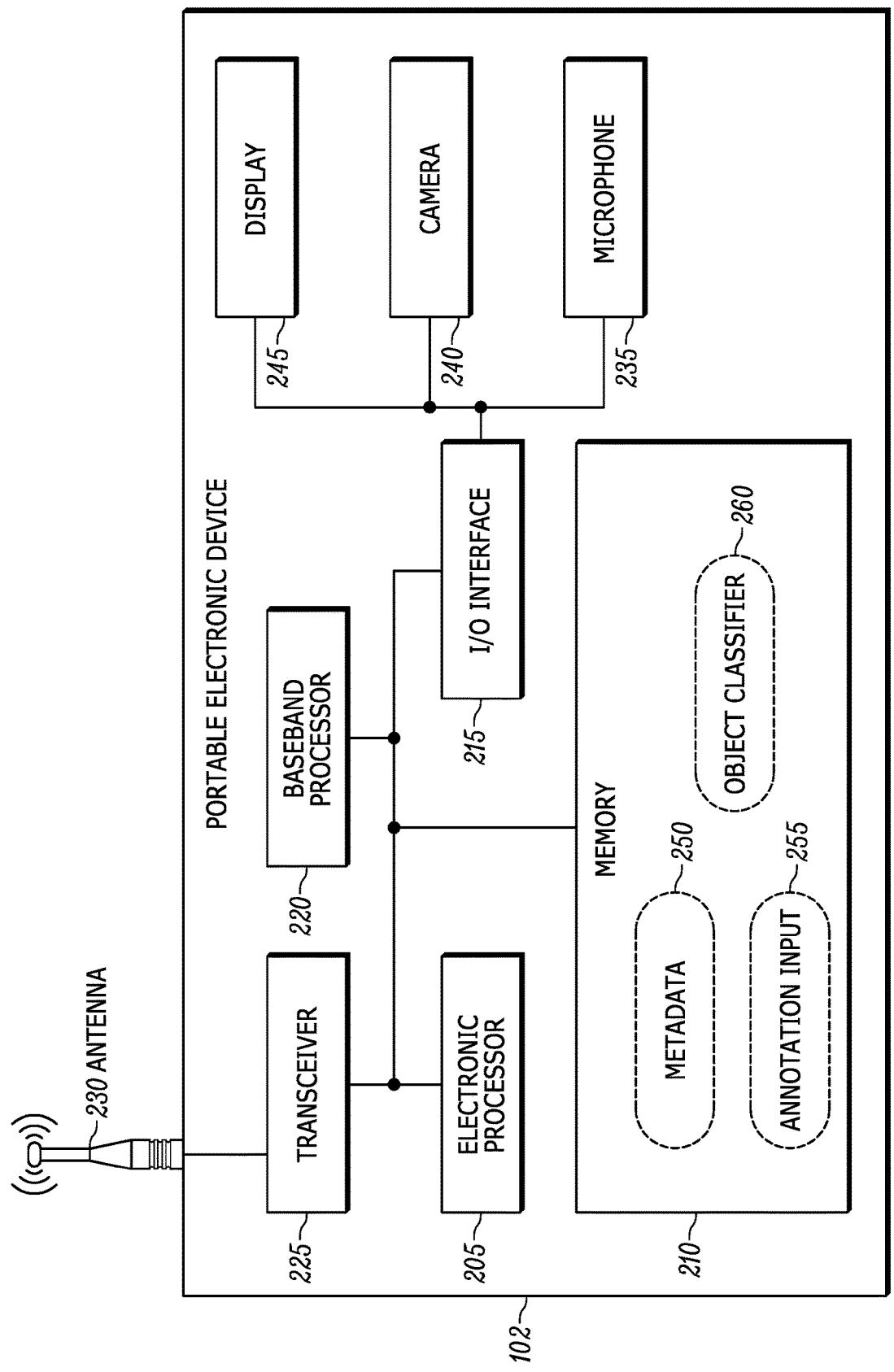
FIG. 2 is a diagram of a mobile electronic device in accordance with some embodiments.

The portable electronic device 102, described more particularly below with respect to FIG. 2, is a wireless communication device that includes hardware and software that enable it to communicate via the network 108. The portable electronic device 102 includes an image capture device (for example, a camera), and is capable of capturing, storing, analyzing, displaying, and transmitting captured images of the incident scene 110, including images of the object of interest 112. The portable electronic device 102 operates using, among other things, augmented reality technology, where live images are captured by the image capture device and displayed (for example, on a screen) with text, graphics, or graphical user interface elements superimposed on or otherwise combined with the live images. As described in detail below, the superimposed text or graphics may be used to record or convey information about the incident scene 110, the object of interest 112, or both.

The incident scene 110 is the scene of an incident to which public safety personnel may respond (for example, the scene of a traffic accident or a crime scene). The incident scene 110 may be located indoors or outdoors. The object of interest 112 may be any object present at the incident scene, which object is related to the incident (for example, involved in or relevant to an investigation of the incident). Objects of interest may include, for example, automobiles (for example, in the case of a traffic accident) and weapons (for example, in the case of a crime scene). Objects of interest may also be tangible things not commonly thought of as objects, but which are still removable or transitory in nature (for example, fluids leaked from automobiles, debris from damaged property, blood stains, broken glass, skid marks, and fingerprints). In some embodiments, a person (for example, a crime or accident victim, persons gathered at the scene, and the like) may also be an object of interest. The incident scene 110 may include more than one object of interest 112.

The server 104 is a computer server that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. The electronic processor is configured to retrieve instructions and data from the memory and execute, among other things, instructions to perform the methods described herein. The server 104 sends and receives data over the network 108 using the network interface.

The server 104 reads and writes data to and from the database 106. As illustrated in FIG. 1, the database 106 may be a database housed on a suitable database server communicatively coupled to and accessible by the server 104. In alternative embodiments, the database 106 may be part of a cloud-based database system external to the system 100 and accessible by the server 104 and the portable electronic device 102 over one or more additional networks. In some embodiments, all or part of the database 106 may be locally stored on the server 104. In some embodiments, as described below, the database 106 electronically stores data on objects of interest (for example, the object of interest 112) and annotations for the objects of interest. In some embodiments, the server 104 and the database 106 are part of a computer-aided dispatch system.

FIG. 2 is a diagram of an example of the portable electronic device 102. In the embodiment illustrated, the portable electronic device 102 includes an electronic processor 205, a memory 210, an input/output interface 215, a baseband processor 220, a transceiver 225, an antenna 230, a microphone 235, a camera 240, and a display 245. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, metadata 250 and annotation input 255 (both described in detail below), and an object classifier 260. As described in detail below, the object classifier 260 (for example, a Haar feature-based cascade classifier) may be executed by the electronic processor 205 to electronically detect and classify objects within images and video streams captured by the camera 240.

The input/output interface 215 is configured to receive input and to provide system output. The input/output interface 215 obtains information and signals from, and provides information and signals to, (for example, over one or more wired and/or wireless connections) devices both internal and external to the portable electronic device 102.

The electronic processor 205 is configured to control the baseband processor 220 and the transceiver 225 to transmit and receive video and other data to and from the portable electronic device 102. The baseband processor 220 encodes and decodes digital data sent and received by the transceiver 225. The transceiver 225 transmits and receives radio signals to and from various wireless communications networks (for example, the network 108) using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The microphone 235 is capable of sensing sound, converting the sound to electrical signals, and transmitting the electrical signals to the electronic processor 205 via the input/output interface 215. The electronic processor 205 processes the electrical signals received from the microphone 235 to, for example, produce an audio stream.

The camera 240 is an image capture device for capturing images and video streams, including a portion or the entire incident scene 110, by, for example, sensing light in at least the visible spectrum. The camera 240 communicates the captured images and video streams to the electronic processor 205 via the input/output interface 215. It should be noted that the terms "image" and "images," as used herein, may refer to one or more digital images captured by the camera 240, or processed by the electronic processor 205, or displayed on the display 245. Further, the terms "image" and "images," as used herein, may refer to still images or sequences of images (that is, a video stream). As illustrated, the camera 240 is integrated into the portable electronic device 102. In alternative embodiments, the camera 240 is separate from the portable electronic device 102, and communicates captured images to the portable electronic device 102 via a wired or wireless connection. For example, the camera 240 may be integrated into a body-worn camera or a vehicle's dash or roof mount camera, which communicates with the portable electronic device 102.

In some embodiments, the camera 240 may be a stereoscopic camera, or the portable electronic device 102 may include a stereoscopic camera. In such embodiments, the portable electronic device 102 can capture three-dimensional information about the incident scene 110 and the object of interest 112. In some embodiments, three-dimensional information may be captured using radar sensors or infrared ranging sensors (not shown).

The display 245 is a suitable display such as, for example, a liquid crystal display (LCD) touch screen, or an organic light-emitting diode (OLED) touch screen. The portable electronic device 102 implements a graphical user interface (GUI) (for example, generated by the electronic processor 205, from instructions and data stored in the memory 210, and presented on the display 245), that enables a user to interact with the portable electronic device 102. In some embodiments, the portable electronic device 102 operates or is integrated with a head-mounted display (HMD) or an optical head-mounted display (OHMD). In some embodiments, the portable electronic device 102 operates or is integrated with a LCD touch screen console display or heads up display (HUD) in a vehicle.

As described in detail below, the portable electronic device 102 is capable of receiving and processing images captured by the camera 240, and displaying processed images in a graphical user interface on the display 245. Computerized image capturing and processing techniques are known, and will not be described in detail.

In some embodiments, the portable electronic device 102 is a smart telephone. In other embodiments, the portable electronic device 102 may be a tablet computer, a vehicle's dash console, a smart watch, a portable radio, or another portable or mobile electronic device containing software and hardware enabling it to operate as described herein.

Figure 3:
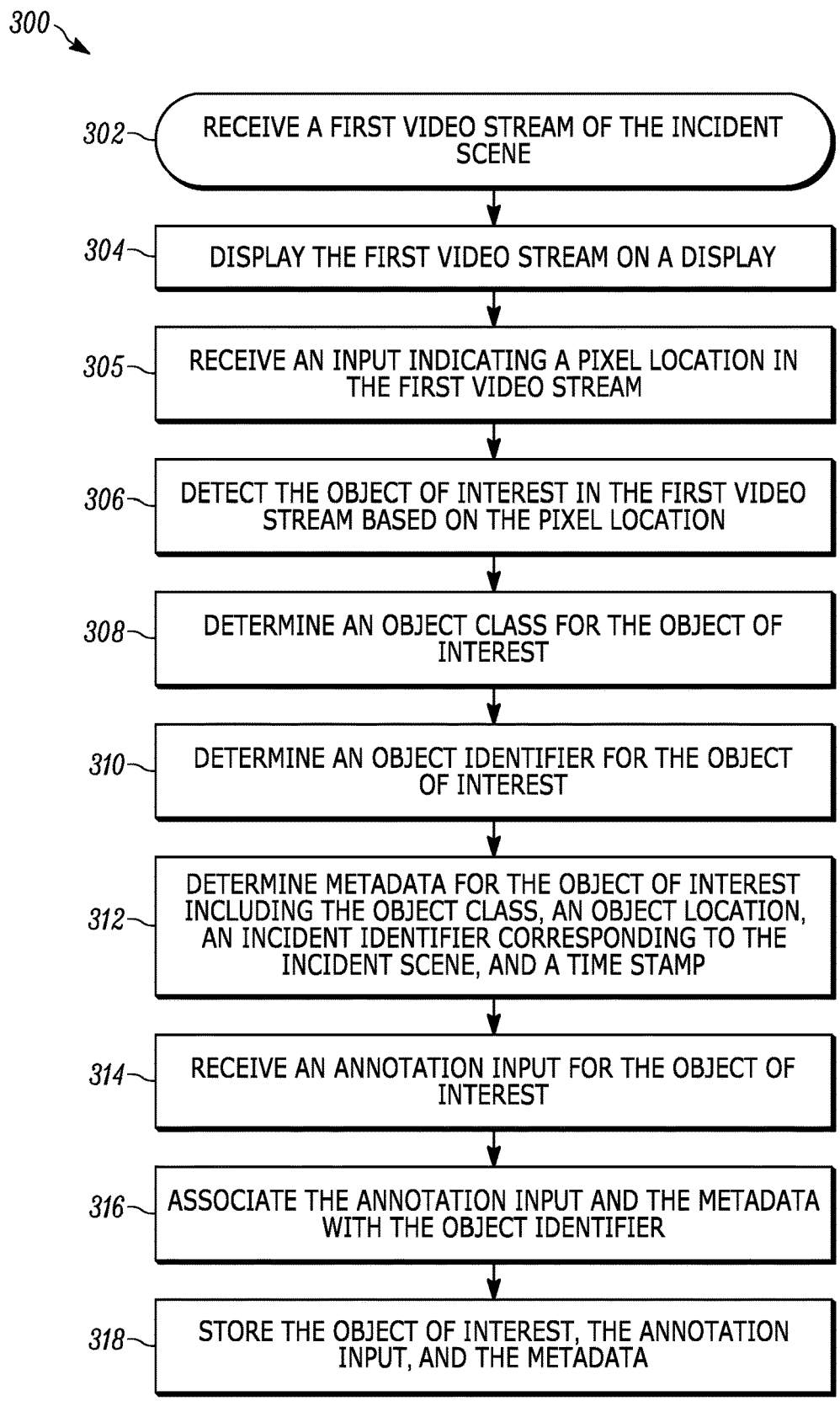
FIG. 3 is a flowchart of a method for selecting and annotating an object of interest located at an incident scene in accordance with some embodiments.
Figure 4:
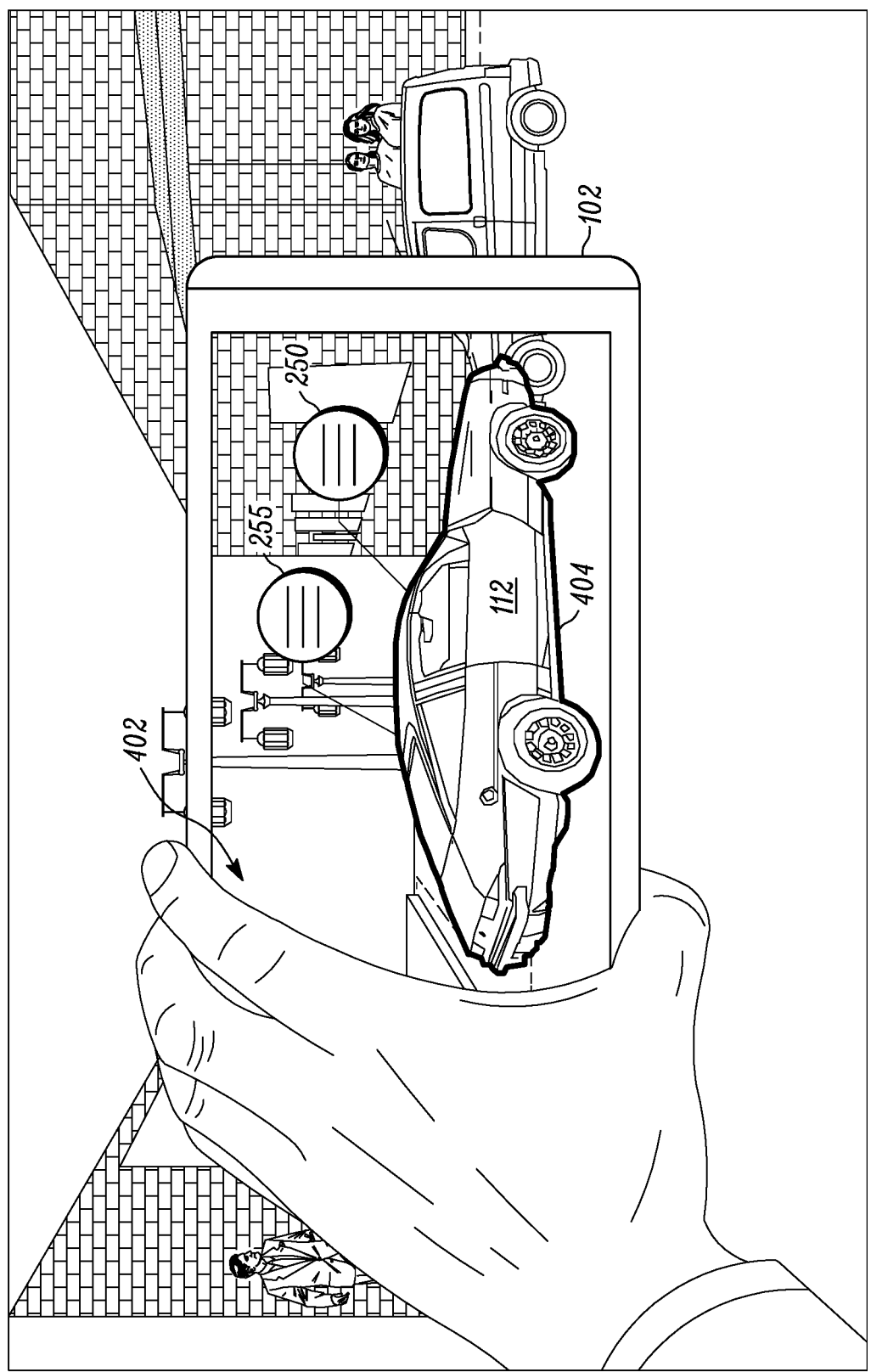
FIG. 4 is a graphical user interface in accordance with some embodiments.

Returning to FIG. 1, an investigator responding to the incident scene 110, using the portable electronic device 102 may wish to document the object of interest 112. Accordingly, FIG. 3 illustrates an example method 300 for selecting and annotating the object of interest 112 at the incident scene 110. The method 300 is described with respect to FIG. 4, which illustrates the incident scene 110 and a graphical user interface displayed on the portable electronic device 102. The method 300 is described as being performed by the portable electronic device 102 and, in particular, the electronic processor 205. However, it should be understood that in some embodiments, portions of the method 300 may be performed by other devices, including for example, the server 104.

At block 302, the electronic processor 205 receives, from the camera 240, a first video stream 402 of the incident scene 110. At block 304, the electronic processor 205 controls the display of the first video stream 402 on the display 245. In some embodiments, the portable electronic device 102 continually captures and displays video streams of the incident scene 110, for example, as in an augmented reality display.

At block 305, the electronic processor 205 receives an input indicating a pixel location in the first video stream 402 (for example, in a frame of the first video stream 402). The input may be in response to a touch, tap, or press on the display 245, which indicates one or more pixels at a pixel location in the first video stream 402. In embodiments where the portable electronic device 102 operates or is integrated with a head-mounted display (HMD) or an optical head-mounted display (OHMD), the input may be in response to a detected hand gesture, a detected eye movement, and the like.

At block 306, the electronic processor 205 detects the object of interest 112 in the first video stream 402 based on the pixel location. For example, the electronic processor 205 may direct the object classifier 260 to detect an object within a limited area surrounding the pixel location. In some embodiments, the object classifier 260 continuously detects and classifies multiple objects in the first video stream 402, and the input and corresponding pixel location are used to select one of the detected objects. Accordingly, it should be noted that it is not a requirement to display the video stream 402 in order to detect an object or objects of interest. In some embodiments, multiple objects may possibly be selected due to object recognition ambiguity, partial overlap of objects in the scene, and close proximity of objects to each other. In these embodiments, the best match will be selected. It should be understood that multiple object selections may be retained for later selection by a user. In some embodiments, the electronic processor 205 determines a boundary 404 for the object of interest 112 based on the pixel location (for example, using edge analytics).

At block 308, the electronic processor 205 determines an object class for the object of interest. For example, the electronic processor 205 may determine an object class using the object classifier 260. In the example illustrated, the object of interest 112 is a vehicle, which has been involved in a traffic accident. In this example, the object class is "vehicle." In some embodiments, the object class may be more or less specific (for example, "compact car," or "transportation"). At block 310, the electronic processor 205 determines an object identifier for the object of interest 112. The object identifier is an electronic identifier, for example, a serial number, which may be used to uniquely identify the object of interest 112 in the database 106.

At block 312, the electronic processor 205 determines metadata 250 for the object of interest including the object class, an object location, an incident identifier corresponding to the incident scene, and a time stamp. In some embodiments, the metadata 250 includes a user identifier for the user who selected the object of interest 112. The metadata may also include data based on the object class. In one example, metadata 250 for the object class "vehicle" may include the color, type (for example, sedan, compact car, truck, or sport utility vehicle), and the license plate of the vehicle (for example, as determined by an optical character recognition analysis of the first video stream 402). The incident identifier is a unique electronic identifier for the incident provided by, for example, a computer aided dispatch system. The time stamp may be, for example, the time and date when the first video stream 402 is captured. The object location is the location of the object of interest 112 within the incident scene 110. The object location may be based on the location of the portable electronic device 102 (for example, as reported by a global positioning system receiver) and the location of the object of interest 112 relative to the portable electronic device 102. In some embodiments, the relative location may be determined using image analysis, for example, by comparing portions of the incident scene near the object of interest 112 to items within the incident scene of a known size to determine a distance. In some embodiments, the relative location may be determined using a range imaging technique (for example, stereo triangulation). In some embodiments, the portable electronic device 102 may be equipped with a range-sensing device, such as, for example, an infrared transceiver for determining the relative location of the object of interest 112. In some embodiments, the location of the object of interest 112 within the incident scene 110 may be determined based on the distance (for example, in pixels) of particular points along the boundary 404 relative to particular points in the first video stream 402. In some embodiments, the metadata 250 includes information indicating the orientation of the object of interest 112 within the incident scene 110, relative to, for example, a fixed vector in the incident scene 110, a compass direction, or the vector representing the orientation of the portable electronic device 102.

At block 314, the electronic processor 205 receives an annotation input 255 for the object of interest. The annotation input 255 may be received from a user of the portable electronic device 102 and may include, for example, text-based annotation, audio annotation, video annotation, and image annotation. At block 316, the electronic processor 205 associates the annotation input 255 and the metadata 250 with the object identifier, and, at block 318, stores (for example, in the memory 210) the object of interest 112 (for example, an image or video of, a reference to, or a description of the object of interest 112, or some combination of the foregoing), the annotation input 255, and the metadata 250. In some embodiments, the object of interest 112 (that is, an image of the object of interest 112), the annotation input 255, and the metadata 250 are communicated to the server 104 and stored in the database 106 in addition to, or in place of, being stored in the memory 210. As illustrated, the metadata 250 and the annotation input 255 are displayed by the graphical user interface of the portable electronic device 102 associated with the object of interest 112. In some embodiments, the annotation input 255 and the metadata 250 are not displayed directly. For example, an icon or icons representing the annotation input 255 and the metadata 250 may be displayed. Inputs received by the electronic processor 205 selecting the icons would allow a user of the portable electronic device 102 to access the annotation input 255 and the metadata 250.

In some embodiments, the electronic processor may receive a second input (for example, a tap or touch) selecting the object of interest, and in response to the second input, display an executable menu based on at least one of the incident identifier, the object identifier, and metadata 250. For example, a second investigator may arrive on the incident scene 110 after the object of interest 112 has been annotated and stored. The second investigator, using another mobile electronic device, may view the incident scene 110 and touch on the object of interest 112 on a display may pop up an executable menu allowing the second investigator to view and edit the metadata 250 or the annotation input 255 (for example, by interacting with a touch screen or a keypad, or by providing voice-to-text inputs). In such embodiments, the metadata 250 may be updated to indicate who edited the metadata 250, and when the edits were made. In some embodiments, all versions of the metadata 250 are stored in order to create an audit trail. The executable menu may trigger the display or more detailed annotations, for example, drilling down from a summary view (for example, "the vehicle contained 4 passengers") into individual data points (for example, the names and vital statistics for the passengers).

As noted above, the object of interest 112, the annotation input 255, and the metadata 250 may be stored in the database 106. Accordingly, they may be made available for other users to access, using one or more computers or portable electronic devices. In such embodiments, each device synchronizes with the database 106, allowing each device to have access to the latest information regarding the incident scene 110 and the object of interest 112. In addition, the annotation input 255 and the metadata 250 may be available for viewing outside of an augmented reality display, for example, in a list format using a note-taking or other application that may or may not be tied to the object of interest 112.

Embodiments of the system 100 include more than one portable electronic device 102. In such embodiments, the other portable electronic devices are able to see the annotations added according to the method 300. For example, the electronic processor 205 receives, from the image capture device, a video stream of the incident scene that includes the object of interest 112 (similar to the first video stream 402 of FIG. 4). The electronic processor 205 displays the video stream on the display 245, and, as described above, detects the object of interest in the video stream. When the object of interest 112 is detected, the electronic processor 205 retrieves, from the memory 210, the annotation input 255 and the metadata 250 based on, for example, the incident identifier and the object identifier, and displays the annotation input 255 and the metadata 250 for the object of interest.

Figure 5:
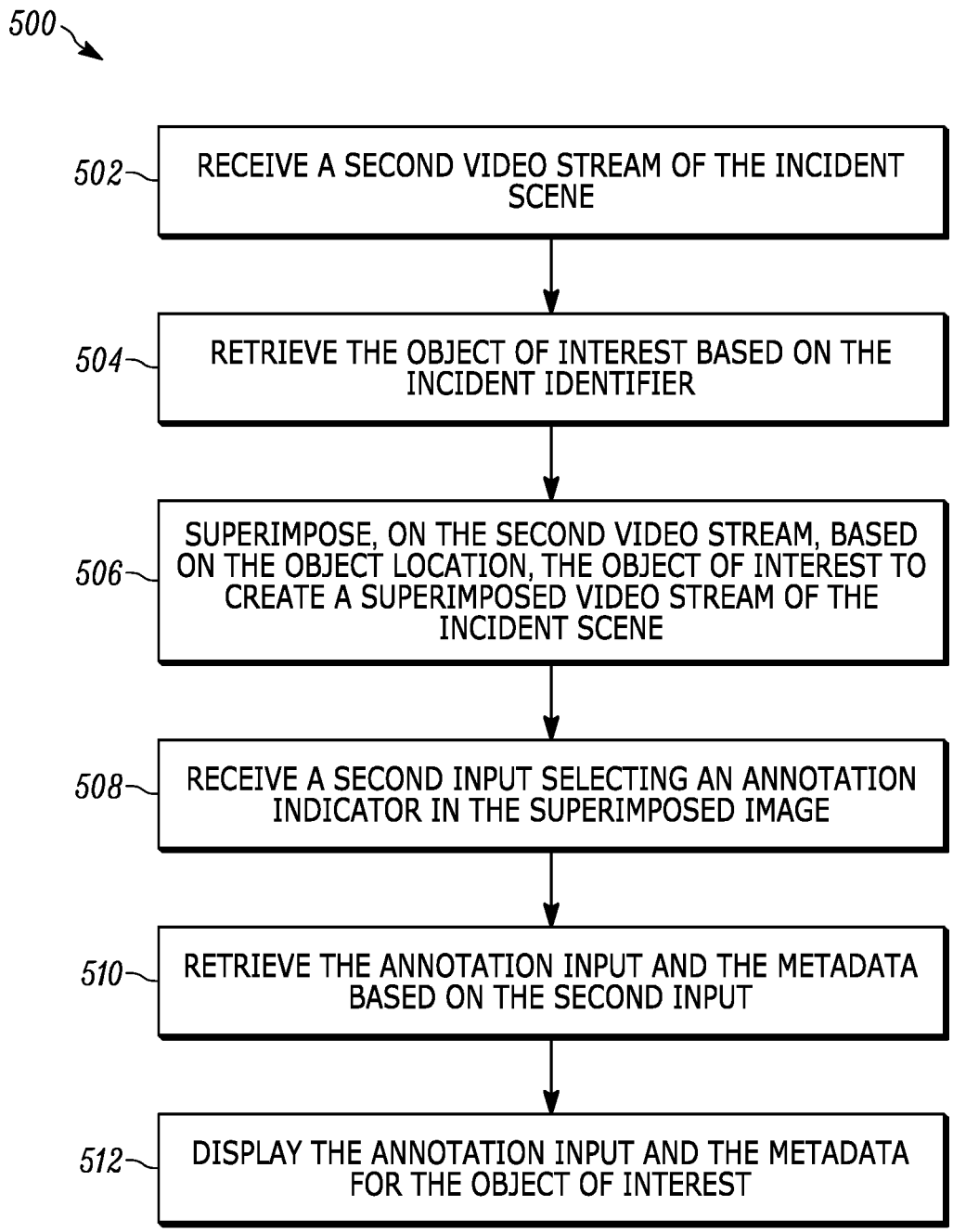
FIG. 5 is a flowchart of a method for displaying an image of an object of interest located at an incident scene in accordance with some embodiments.
Figure 6A:
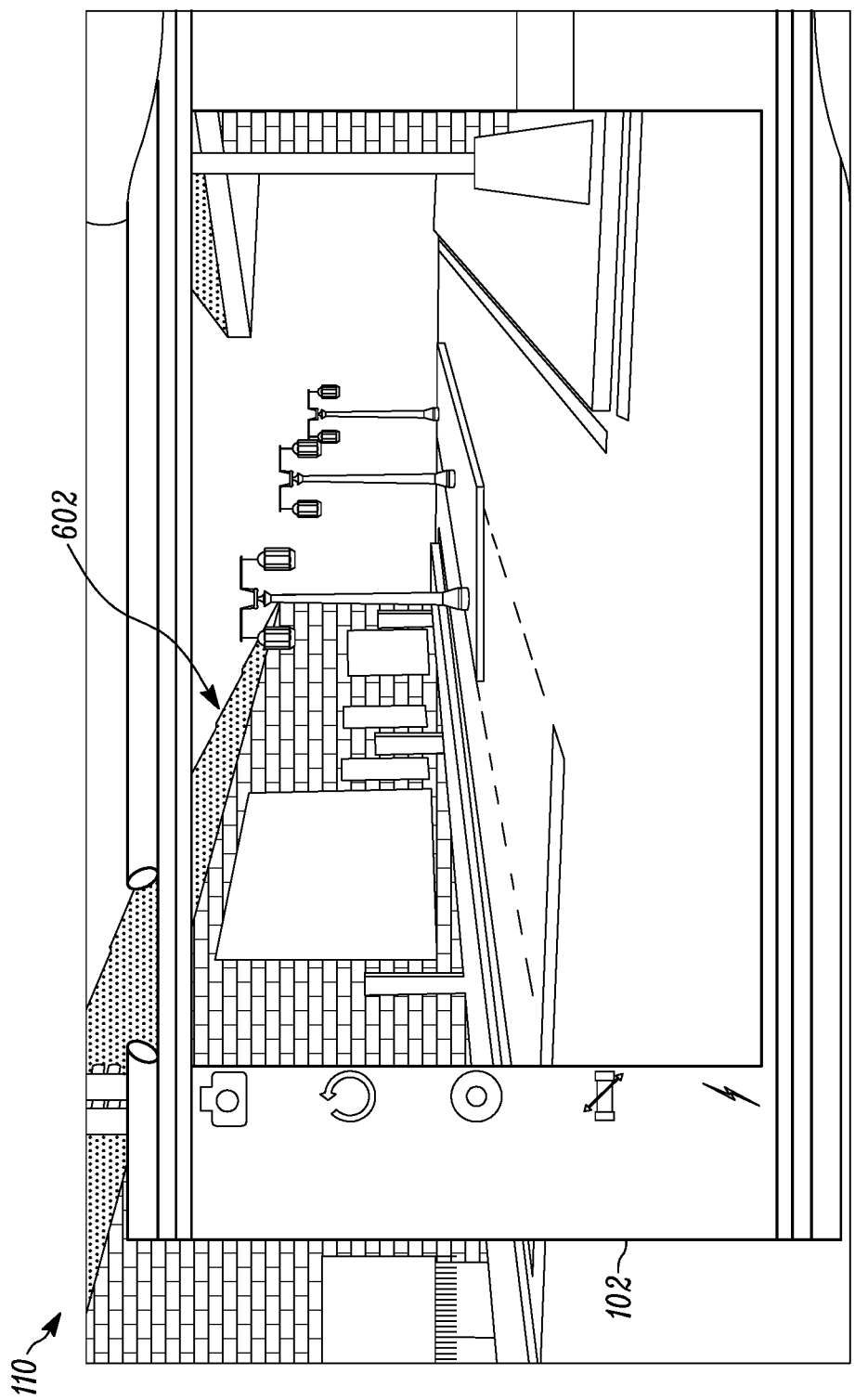
FIG. 6A is a graphical user interface in accordance with some embodiments.

Returning to FIG. 1, the investigator may return to re-investigate the incident scene 110 after the initial investigation is complete and the real-word object of interest 112 has been removed (for example, the vehicle has been towed). Accordingly, FIG. 5 illustrates an example method 500 for displaying an image of the object of interest 112 at the incident scene 110. The method 500 is described with respect to FIGS. 6A and 6B, which illustrate the incident scene 110 and a graphical user interface displayed on the portable electronic device 102. The method 500 is described as being performed by the portable electronic device 102 and, in particular, the electronic processor 205. However, it should be understood that in some embodiments, portions of the method 500 may be performed by other devices, including for example, the server 104.

At block 502, the electronic processor 205 receives, from the camera 240, a second video stream 602 of the incident scene 110. At block 504, the electronic processor 205 retrieves (for example, from the memory 210 or the database 106) the object of interest 112 based on the incident identifier. In some embodiments, the incident identifier is supplied by the investigator. In some embodiments, the incident identifier is determined automatically based on the location of the portable electronic device 102 as compared to the location of the incident scene 110. In some embodiments, the incident identifier is determined and received from a computer aided dispatch system. In some embodiments, when an object of interest is nearby but not in the video stream, the electronic processor 205 may display an indicator of which direction to point the portable electronic device 102 in order to bring the object of interest 112 into view. In some embodiments, the second video stream 602 is not captured. In such embodiments, the incident scene 110 may be reconstructed based on the location of the incident scene 110 (for example, as provided by the incident scene identifier) and a direction in which the portable electronic device 102 is pointed.

Figure 6B:
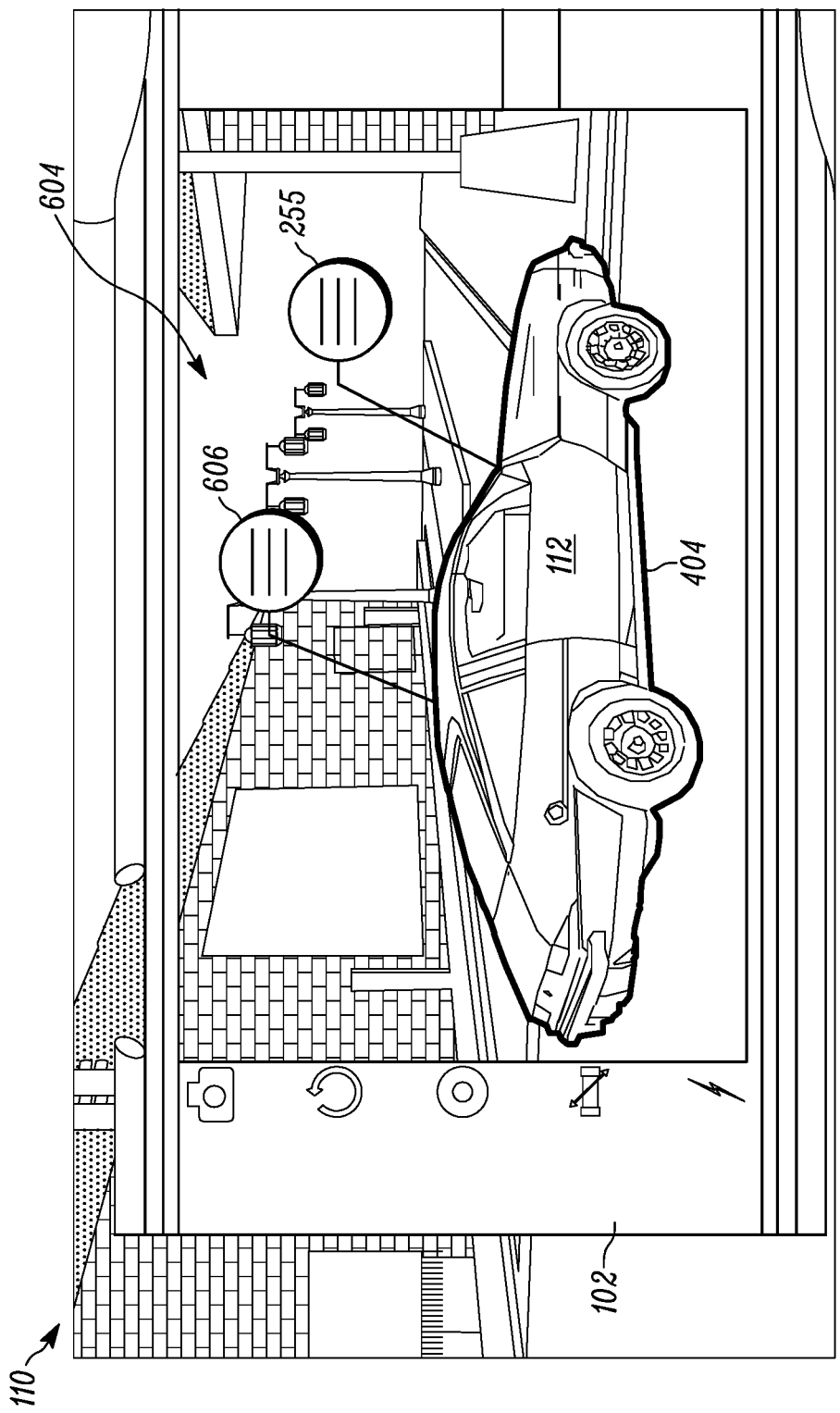
FIG. 6B is a graphical user interface in accordance with some embodiments.

At block 506, the electronic processor 205 superimposes or otherwise combines, on the second video stream 602, based on the object location, the object of interest 112 to create a superimposed video stream 604 of the incident scene 110. The investigator (or any other user) viewing the incident scene 110 on the portable electronic device 102, can now see the object of interest 112 as it appeared at the time of the capture of the first video stream 402. As illustrated in FIG. 6B, the portable electronic device 102 presents an augmented reality view of the incident scene 110. In some embodiments, the electronic processor 205 may use three-dimensional information captured for the object of interest 112 to display a three-dimensional model of the object of interest 112. In some embodiments, if three-dimensional information is incomplete, the model may be completed using data retrieved based on the object class or the metadata 250. For example, if the object class and the metadata 250 indicate that the object of interest 112 is a particular make, model, and year of vehicle, an automotive database might be queried to retrieve images and dimensional information for that vehicle. In some embodiments, the object of interest 112 may be displayed on a 2D map of the incident scene 110.

As illustrated in FIG. 6B, the object of interest is displayed with an annotation indicator 606. The annotation indicator 606 indicates that the object of interest 112 has annotations associated with it. The annotation indicator 606 may be an icon, for example, including a title(s) and the type(s) of annotation(s) associated with the object of interest 112. At block 508, the electronic processor 205 receives a second input selecting annotation indicator in the superimposed video stream 604. The second input may be, for example, a tap or touch on the display 245. At block 510, the electronic processor 205 retrieves the annotation input 255, the metadata 250, or both, based on the second input. For example, the electronic processor 205 retrieves, from the database 106, the annotation input 255 and the metadata 250 stored using the method 300, based on the object identifier for the object of interest 112. In some embodiments, the annotation input 255 may be shown directly (for example, when the annotation consists of a short note).

At block 512, the electronic processor 205 displays the annotation input 255 and the metadata 250 for the object of interest 112. In some embodiments, the metadata 250 includes a current location for the object of interest 112. For example, the metadata may indicate that a weapon from a crime scene has been stored in a particular evidence locker at the police station, or the metadata may indicate that a vehicle is in the police impound lot.

Figure 7:
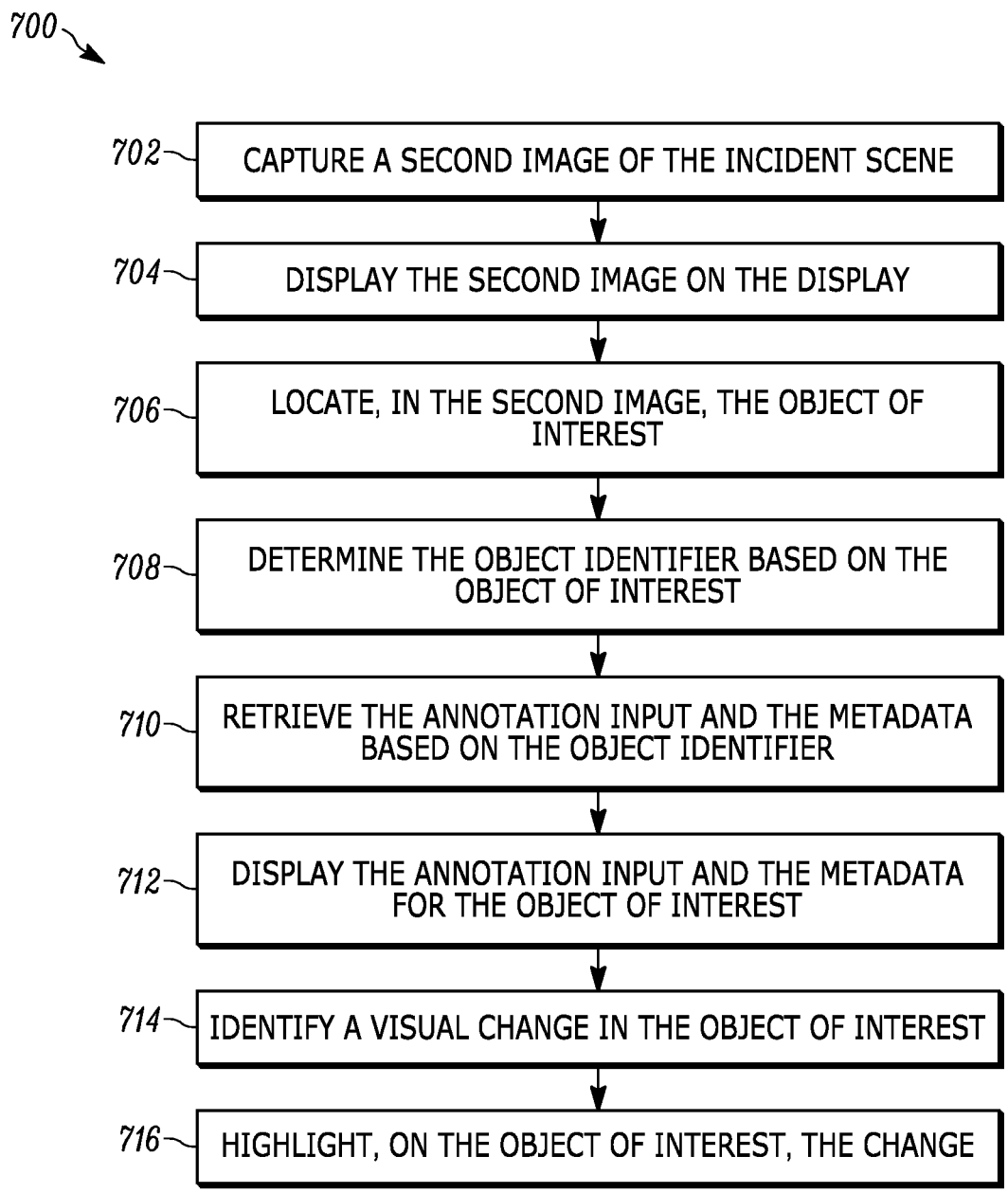
FIG. 7 is a flowchart of a method for highlighting a visual change in an image of an object of interest located at an incident scene in accordance with some embodiments.
Figure 8A:
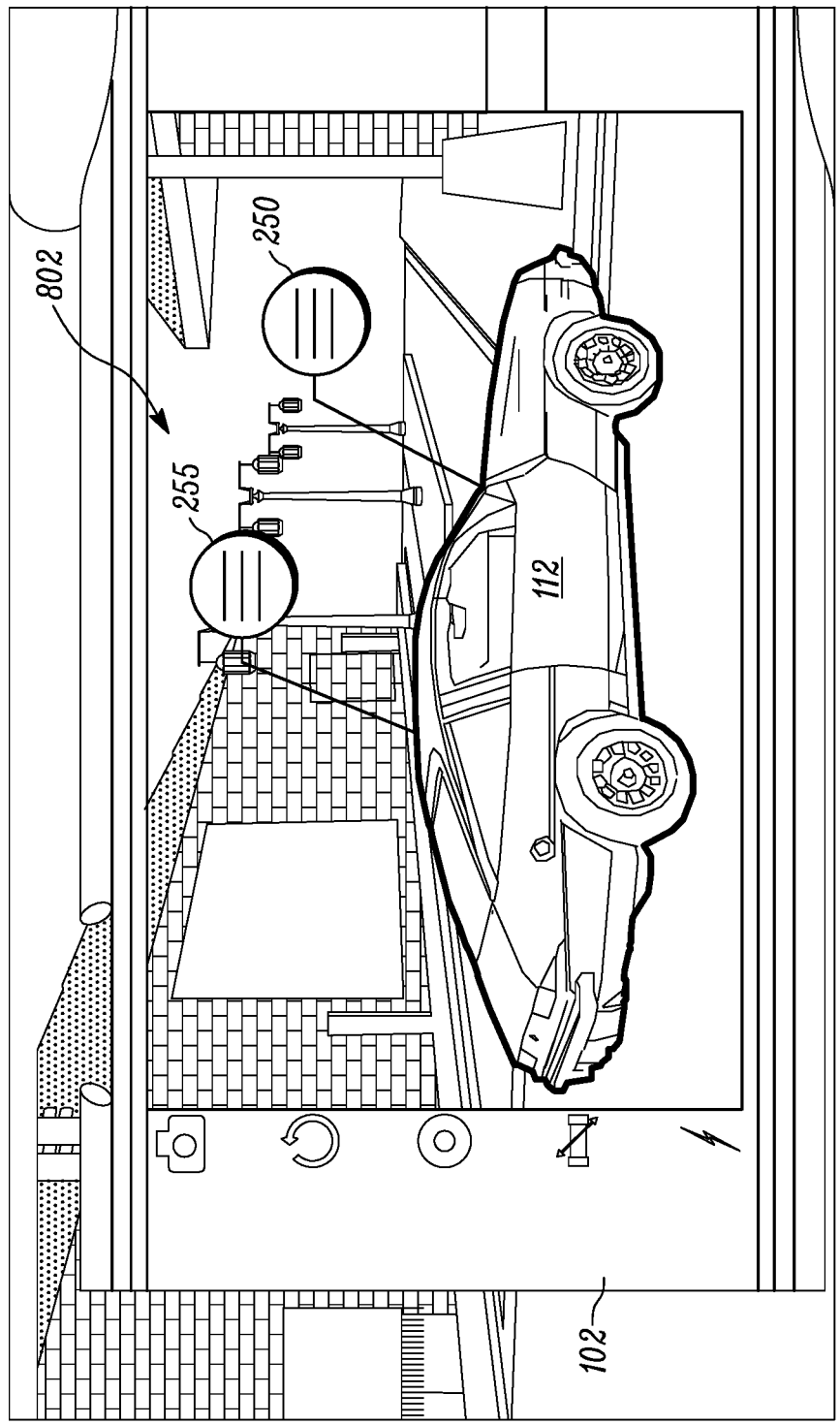
FIG. 8A is a graphical user interface in accordance with some embodiments.

In some instances, an investigator may return to re-investigate the incident scene 110 after the initial investigation is complete, but before the real-world object of interest 112 has been removed. Accordingly, FIG. 7 illustrates an example method 700 for highlighting a visual change in an image of an object of interest 112 located at an incident scene 110. The method 700 is described with respect to FIGS. 8A and 8B, which illustrate the incident scene 110 and a graphical user interface displayed on the portable electronic device 102. The method 700 is described as being performed by the portable electronic device 102 and, in particular, the electronic processor 205. However, it should be understood that in some embodiments, portions of the method 700 may be performed by other devices, including for example, the server 104.

At block 702, the electronic processor 205 and the camera 240 capture a second video stream 802 of the incident scene 110. At block 704, the electronic processor 205 displays the second video stream 802 on the display 245. At block 706, the electronic processor 205 locates, in the second video stream 802, the object of interest 112, as describe above with respect to the method 300. At block 708, the electronic processor 205 determines the object identifier based on the object of interest 112, as described above.

At block 710, the electronic processor 205 retrieves (for example, from the memory 210, the database 106, or both) the annotation input 255 and the metadata 250 based on the object identifier. At block 712, the electronic processor 205 displays the annotation input 255 and the metadata 250 for the object of interest 112.

At block 712, the electronic processor 205 identifies a visual change 804 in the object of interest 112. For example, the electronic processor 205 may use image processing techniques to compare the object of interest 112 from the first video stream 402 with the object of interest 112 in the second video stream 802 to determine if any portions of the object of interest 112 have changed since the first video stream 402 was captured (for example, by comparing the time stamp to the current time). In some embodiments, the electronic processor 205 identifies a change in state (for example, the size, shape, location, color, the presence of smoke, a door or window is now open or closed, and the like) for the object of interest 112. In some embodiments, the electronic processor 205 identifies a change as something (for example, a license plate) missing from the object of interest.

Figure 8B:
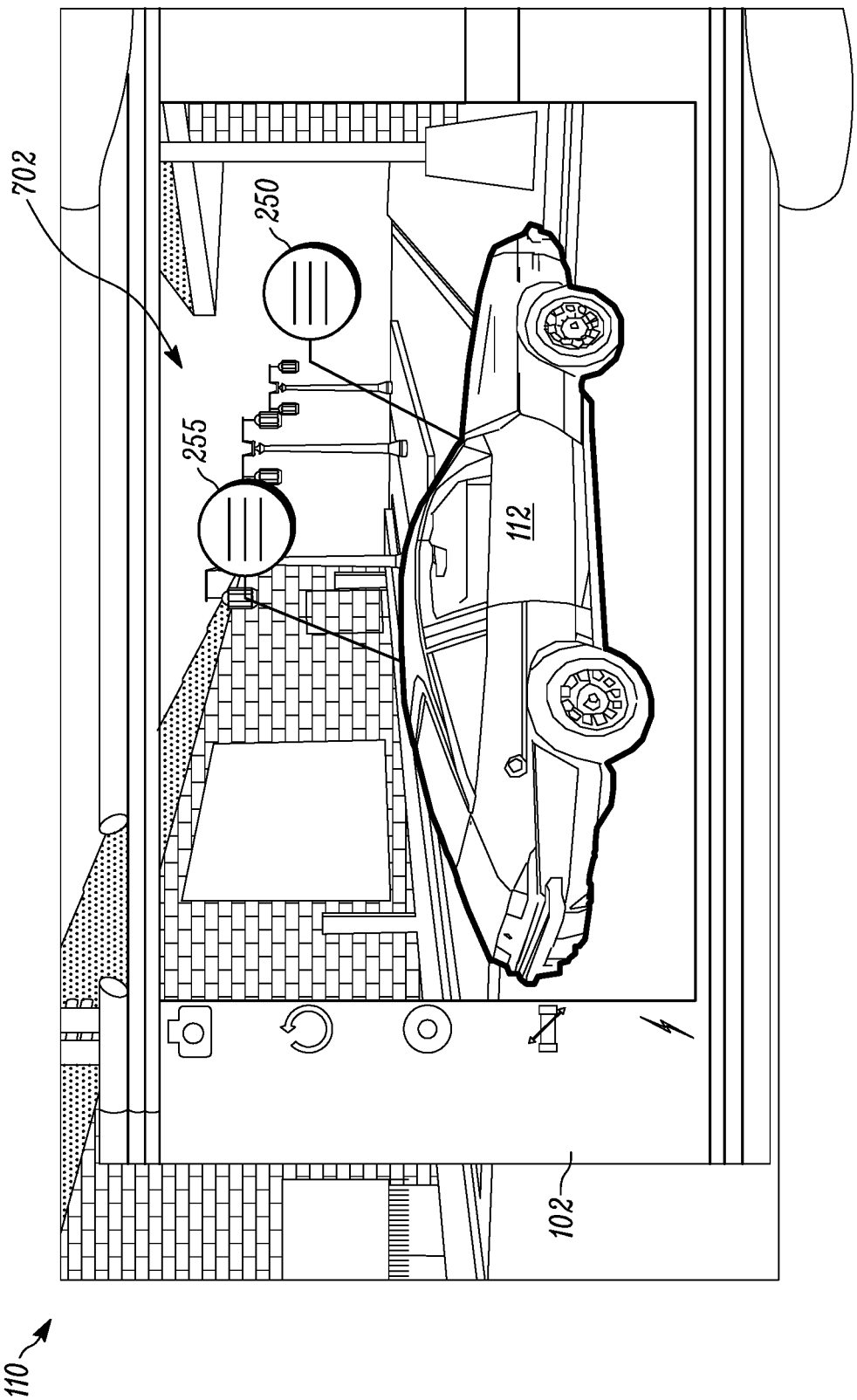
FIG. 8B is a graphical user interface in accordance with some embodiments.

At block 716, the electronic processor 205 highlights, on the object of interest 112, the change. For example, as illustrated in FIG. 8B, the change may be shaded to highlight the area.

In some embodiments, the electronic processor 205 displays, on the display 245, a timeline based on the incident scene 110 and the time stamp. For example, the timeline may display the time stamp on one end, the current time on the other end, and hash marks in between noting divisions of time (for example, hours). In such embodiments, the electronic processor may receive an input selecting a selected time (for example, a tapping of one of the hash marks) on the timeline, and update the object of interest 112, the annotation input 255, and the metadata 250 based on the selected time. For example, any updates since the selected time to those items may not be displayed, or may be greyed out to indicate that they are not applicable to the currently-selected time.

In some embodiments, the electronic processor 205 may display other information related to the incident scene 110. For example, the electronic processor 205 may display an incident scene perimeter, or the location(s) of other personnel at or relative to the incident scene 110.

Figure 9:
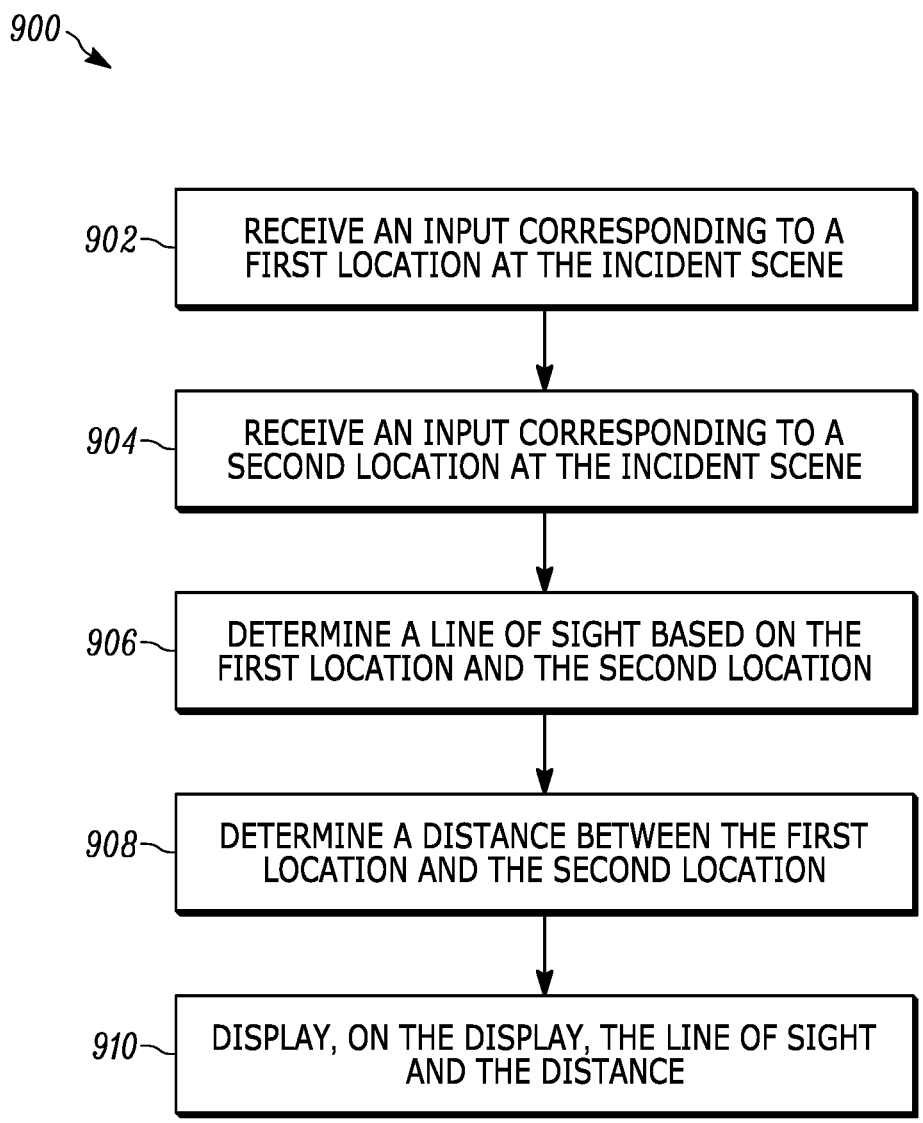
FIG. 9 is a flowchart of a method for annotating an incident scene in accordance with some embodiments.
Figure 10:
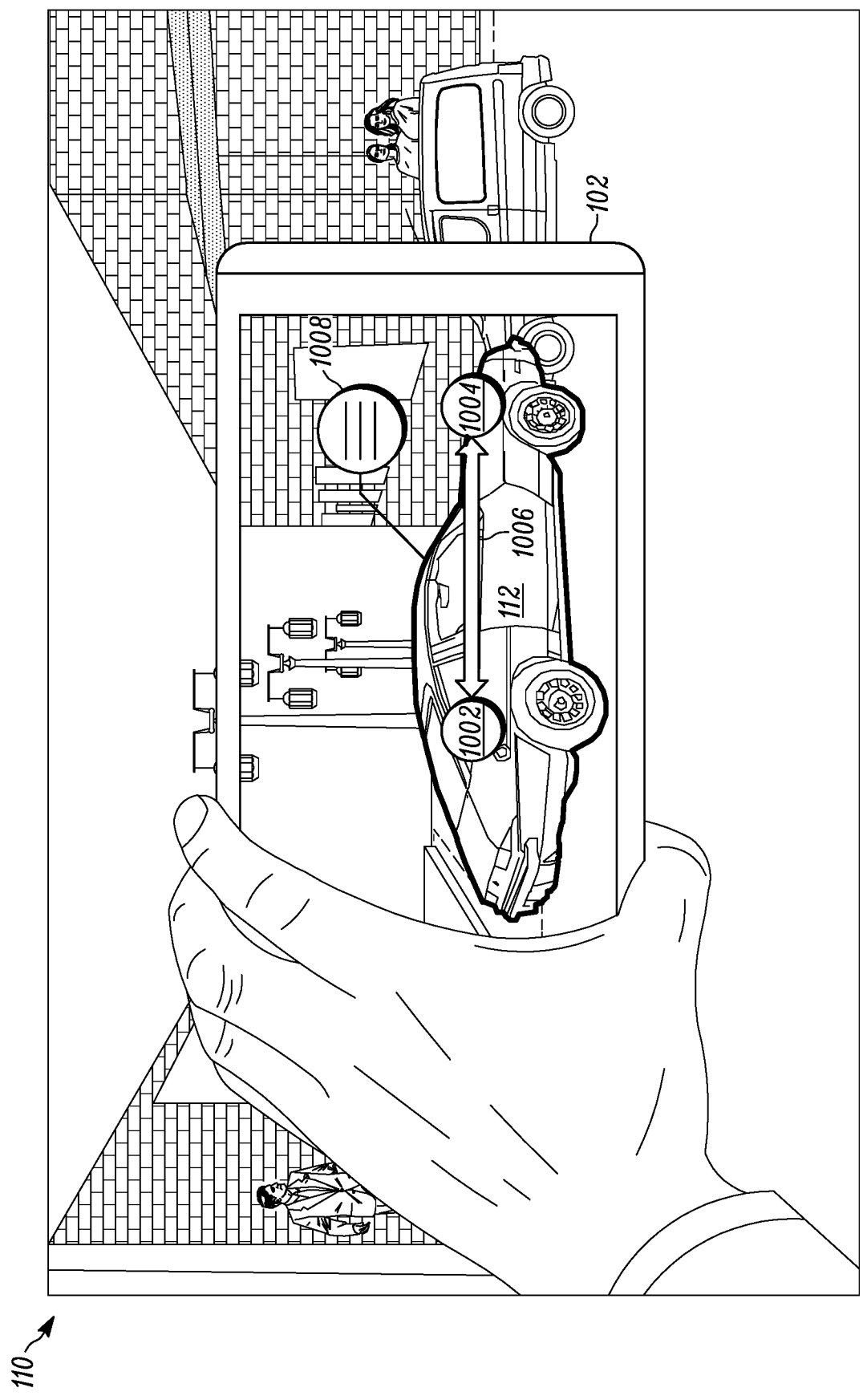
FIG. 10 is a graphical user interface in accordance with some embodiments.

In some cases, an investigator may want to indicate whether a line of sight exists between two points in the incident scene 110. For example, in a crime scene, it may be advisable to know whether a line of sight exists between where a suspect was located and where a victim was wounded by gunfire. Accordingly, FIG. 9 illustrates an example method 900 for annotating the incident scene 110. The method 900 is described with respect to FIG. 10, which illustrates the incident scene 110 and a graphical user interface displayed on the portable electronic device 102. The method 900 is described as being performed by the portable electronic device 102 and, in particular, the electronic processor 205. However, it should be understood that in some embodiments, portions of the method 900 may be performed by other devices, including for example, the server 104.

At block 902, the electronic processor 205 receives an input corresponding to a first location 1002 at the incident scene 110. At block 904, the electronic processor 205 receives an input corresponding to a second location 1004 at the incident scene 110. The inputs received may be, for example, taps or touches on the display 245.

A line of sight is an unobstructed path between the first location 1002 and the second location 1004. At block 906, the electronic processor 205 determines a line of sight 1006 based on the first location 1002 and the second location 1004. The line of sight 1006 is determined, for example, through image analysis and range imaging.

At block 908, the electronic processor determines a distance 1008 between the first location 1002 and the second location 1004. In some embodiments, the distance 1008 is determined similarly to determining the relative location for the object of interest 112, as described above with respect to the method 300. At block 910, the electronic processor 205 displays, on the display 245, the line of sight 1006 and the distance 1008.

It should be noted that the systems and methods described above refer to a single incident scene 110 and a single object of interest 112. However, the systems and methods apply to multiple incident scenes and multiple objects of interest. For example, selecting an object of interest, as described above, may apply to selecting one from several objects of interest displayed. It should also be noted that the systems and methods presented herein are applicable outside of public safety field. For example, public or private utility workers may use the systems and methods described above to identify and annotate infrastructure objects (for example, utility poles, fire hydrants, transformers, control boxes, and the like). In another example, construction workers may use the systems and methods described above to identify and annotate objects of interest at construction sites (for example, by noting items needing attention for the next shift or crew coming in).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for displaying an image of an object of interest located at an incident scene, the system comprising:
    an image capture device;
    a display;
    a memory; and
    an electronic processor coupled to the image capture device, the display, and the memory, and configured to
        receive, from the image capture device, a first video stream of the incident scene captured at a first time;
        display the first video stream on the display;
        receive an input indicating a pixel location in the first video stream;
        detect the object of interest in the first video stream based on the pixel location;
        determine an object class for the object of interest;
        determine an object identifier for the object of interest;
        determine metadata for the object of interest including the object class, an object location relative to the image capture device within the incident scene, a unique incident identifier from a computer-aided dispatch system and corresponding to the incident scene, and a time stamp;
        receive an annotation input for the object of interest;
        associate the annotation input and the metadata with the object identifier;
        store, in the memory, the object of interest, the annotation input, and the metadata;
        receive, from the image capture device, a second video stream of the incident scene at a second time, the second time being different from the first time;
        display the second video stream on the display;
        locate, in the second video stream, the object of interest;
        determine the object identifier based on the object of interest;
        retrieve, from the memory, the annotation input and the metadata based on the object identifier;
        display the annotation input and the metadata for the object of interest;
        identify a visual change in a portion of the object of interest; and
        highlight, on the object of interest, the visual change.

2. The system of claim 1, wherein the electronic processor is further configured to
    detect the object of interest in the first video stream using an object classifier; and
    determine the object class using the object classifier.

3. The system of claim 1, wherein the electronic processor is further configured to
    retrieve, from the memory, the object of interest based on the incident identifier;
    superimpose, on the second video stream, based on the object location, the object of interest to create a superimposed video stream of the incident scene;
    receive a second input selecting an annotation indicator in the superimposed video stream;
    retrieve the annotation input and the metadata based on the second input; and
    display the annotation input and the metadata for the object of interest.

4. The system of claim 3, wherein the metadata includes a current location for the object of interest.

5. The system of claim 1, wherein the electronic processor is further configured to
    display, on the display, a timeline based on the incident scene and the time stamp;
    receive a second input selecting a selected time on the timeline; and
    update the object of interest, the annotation input, and the metadata based on the selected time.

6. The system of claim 1, wherein the electronic processor is further configured to
    receive a second input selecting the object of interest; and
    in response to the second input, display an executable menu based on at least one selected from a group consisting of the incident identifier, the object identifier, and the metadata;
    wherein the executable menu performs one of entering an edit mode and displaying detailed annotations.

7. The system of claim 1, wherein the electronic processor is further configured to
    receive an input corresponding to a first location at the incident scene;

receive an input corresponding to a second location at the incident scene;

determine a line of sight based on the first location and the second location;

determine a distance between the first location and the second location; and display, on the display, the line of sight and the distance.

8. The system of claim 1, wherein the display is a head-mounted display.

9. A method for displaying an image of an object of interest located at an incident scene on a display of a device, the method comprising:

receiving, from an image capture device, a first video stream of the incident scene captured at a first time;

displaying the first video stream on the display;

receiving an input indicating a pixel location in the first video stream;

detecting the object of interest in the first video stream based on the pixel location;

determining an object class for the object of interest;

determining an object identifier for the object of interest;

determining metadata for the object of interest including the object class, an object location relative to the image capture device within the incident scene, a unique incident identifier from a computer-aided dispatch system and corresponding to the incident scene, and a time stamp;

receiving an annotation input for the object of interest;

associating the annotation input and the metadata with the object identifier;

storing, in a memory, the object of interest, the annotation input, and the metadata;

receiving, from the image capture device, a second video stream of the incident scene at a second time, the second time being different from the first time;

displaying the second video stream on the display;

locating, in the second video stream, the object of interest;

determining the object identifier based on the object of interest;

retrieving, from the memory, the annotation input and the metadata based on the object identifier;

displaying the annotation input and the metadata for the object of interest;

identifying a visual change in the object of interest; and highlighting, on the object of interest, the visual change.

10. The method of claim 9, wherein detecting the object of interest includes detecting the object of interest using an object classifier; and determining an object class for the object of interest includes determining an object class using the object classifier.

11. The method of claim 9, wherein receiving an annotation input for the object of interest includes receiving at least one of a text-based annotation and an audio annotation.

12. The method of claim 9, further comprising:

superimposing, on the second video stream, based on the object location, the object of interest to create a superimposed video stream of the incident scene;

receiving a second input selecting an annotation indicator in the superimposed video stream;

retrieving the annotation input and the metadata based on the second input; and displaying the annotation input and the metadata for the object of interest.

13. The method of claim 12, wherein displaying the metadata for the object of interest includes displaying a current location for the object of interest.

14. The method of claim 9, further comprising:

displaying, on the display, a timeline based on the incident scene and the time stamp;

receiving a second input selecting a selected time on the timeline; and updating the object of interest, the annotation input, and the metadata based on the selected time.

15. The method of claim 9, further comprising:

receiving a second input selecting the object of interest; and in response to the second input, displaying an executable menu based on at least one selected from a group consisting of the incident identifier, the object identifier, and the metadata;

wherein the executable menu performs one of entering an edit mode and displaying detailed annotations.

16. The method of claim 9, further comprising:

receiving an input corresponding to a first location at the incident scene;

receiving an input corresponding to a second location at the incident scene;

determining a line of sight based on the first location and the second location;

determining a distance between the first location and the second location; and displaying, on the display, the line of sight and the distance.

* * * * *